Aug. 21, 1962  M. M. JOHNSON ET AL  3,049,872
JET ENGINE COMBUSTION PROCESS
Filed Oct. 30, 1958  3 Sheets-Sheet 1
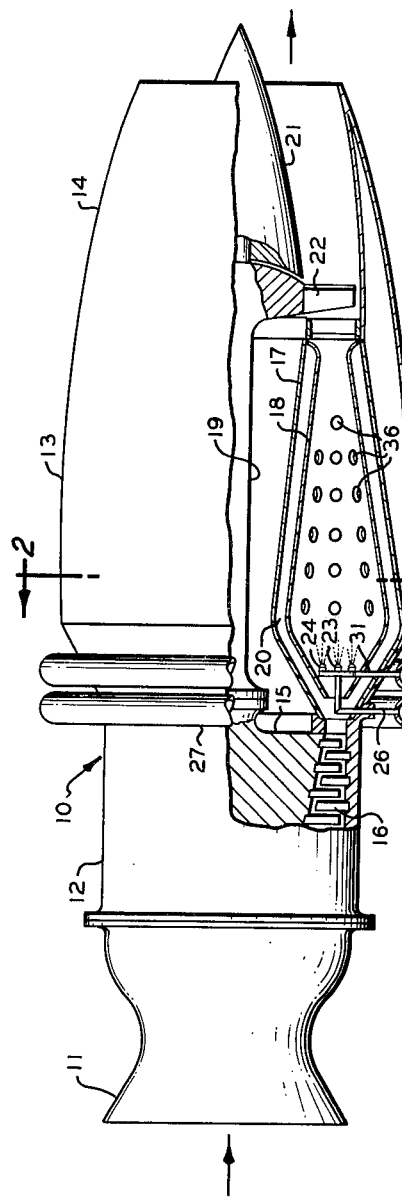
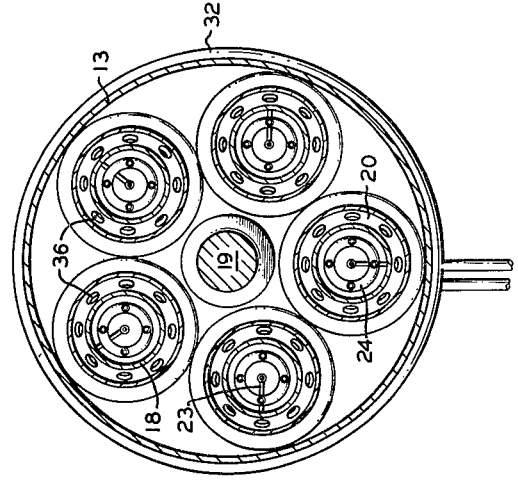
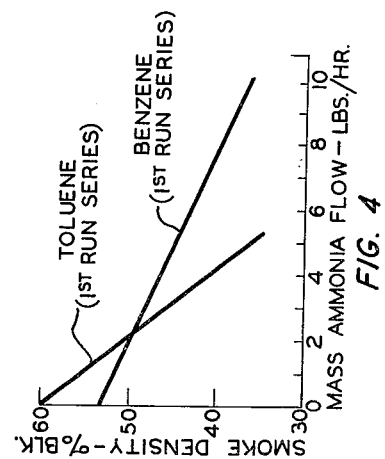
INVENTORS
M.M. JOHNSON
R.M. SCHIRMER
BY Hudson & Young
ATTORNEYS

United States Patent Office 3,049,872
Patented Aug. 21, 1962

3,049,872
JET ENGINE COMBUSTION PROCESS
Marvin M. Johnson and Robert M. Schirmer, Bartlesville, Okla., assignors to Phillips Petroleum Company, a corporation of Delaware
Filed Oct. 30, 1958, Ser. No. 770,839
12 Claims. (Cl. 60—35.4)

This invention relates to the operation of continuous combustion type power plants, particularly those of the aerodynamic type such as turbojets, ramjets and pulsejets. In another aspect it relates to a method of operating such power plants in such a manner as to improve the combustion efficiency thereof. In another aspect it relates to an improved jet engine combustion process characterized by minimum carbon formation. In another aspect it relates to an improved jet engine combustion process characterized by reduced flame radiation intensity. In a still further aspect it relates to an improved power plant of the continuous combustion type.

The subject invention is concerned with the operation of continuous combustion power plants, particularly those of the aerodynamic type, the latter generally being classified into three distinct categories, namely, turbojets, ramjets and pulsejets, all of these being jet engines having one fundamental feature in common: the mechanism by which ambient air is ducted into a device, accelerated to greater momentum, and then exhausted to impart thrust to the engine.

While these jet engines may be operated on a wide variety of fuels, the particular fuel utilized has a definite effect on engine performance or combustion efficiency. Many hydrocarbons are unsuitable for use as jet engine fuel because the combustion efficiencies of such hydrocarbons are poor, as evidenced by excessive formation of resinous and/or carbonaceous material, hereinafter generally referred to as carbon, when such hydrocarbons are burned in a jet combustor. Flames containing excessive carbon burn luminously and add undesirable heat by radiation to engine parts which are exposed to the high energy released by the combustion process, prolonged operation under these conditions causing the overheating of these engine parts, consequently effecting their durability as manifested by buckling of the flame tube, distortion of air inlet openings, burn-off or loss of metal from exposed surfaces, etc. The excessive formation of carbon also often results in its deposition on the flame tube or other vital parts of the combustion chamber or the turbine in a turbojet engine. Such deposition has a deleterious effect on jet engines in general because deposition of such material results in hot spots forming on the surface of the combustion chamber, promoting subsequent failure of that chamber, or disturbing the air flow or fuel flow in the combustion system and thereby reducing the combustion efficiency of the engine. Severe deposition of carbon may result in the breaking away of chunks or pieces of carbon from the combustion chamber surfaces, the dislodged carbon then being blown into the blades of the high speed turbine causing mechanical damage thereto.

With excessive carbon formation, of course, the smoke density of the exhausted combustion gases increases. Smoky or dirty jet exhaust constitutes an operational nuisance, particularly at take-off. Such jet exhaust also aids enemy detection of military aircraft.

It has been recently discovered that when some types jet engines of the continuous combustion type, i.e., turbojets, are operated at relatively high pressures, e.g. 10 to 17 atmospheres, which appears to be the general trend in the industry, the combustion of many hydrocarbon fuels results in a still further increase in carbon formation and more intense flame radiation, although carbon deposition is not as pronounced as when operating at lower pressures. That is, the heat transfer from the flame zone to the surrounding metal walls becomes more intense at high operating pressures which favor the formation of carbon in the flame.

A great number of hydrocarbon fuels containing varying amounts of paraffins, naphthenes and aromatics have either been proposed or used in continuous combustion power plants. Since fuels of the paraffinic and naphthenic straightrun type are easier to burn and produce less carbon than those fuels of the aromatic type made from cracked stocks, the former are more widely used than the latter type of fuel. As a result, the applicability of fuels useful in operating jet engines is limited generally to those of the paraffinic and naphthenic type containing less than 20 volume percent aromatics. Actually, although aromatic fuels are more difficult to burn and exhibit excessive carbon formation, it is well known that heavier aromatic fuels of high boiling points have greater heating value per gallon than either paraffinic or naphthenic fuels. At the present time, many turbojet powered aircraft are volume-limited rather than weight-limited insofar as fuel capacity is concerned. Therefore, the heat content of the fuel per unit volume is important in the operation of turbojets. On the basis of increasing the range of aircraft it would be advantageous to utilize aromatic type fuels with high boiling points and low volatility. However, since aromatic fuels do give rise to excessive carbon formation, these fuels have not enjoyed wide usage.

Although the combustion efficiency of a jet engine can be improved somewhat by engine design, notwithstanding excessive carbon formation, intense flame radiation, etc., the latter operational difficulties have to date been only partially overcome by engine design, and therefore there has arisen a need for improving engine efficiency by other routes.

Accordingly an object of this invention is to improve the operation of continuous combustion power plants, particularly those of the aerodynamic type such as turbojets, ramjets and pulsejets. Another object is to provide a method for operating continuous combustion power plants without excessive carbon formation and intense flame radiation. Another object is to minimize carbon formation and deposition in operating a continuous combustion jet engine. Another object is to provide an improved method of operating a jet engine combustion system so as to enable the use of hydrocarbon fuels having a higher aromatic content than those fuels now enjoying wide usage. A further object is to provide an improved method of operating a jet engine of the continuous combustion type at relatively high pressures without excessive formation of carbon. Another object is to provide a method of operating a continuous combustion power plant in such a manner as to minimize the effects of carbon deposition and intense flame radiation on the durability of engine parts exposed to the high energy released by the combustion process. Further objects and advantages of this invention will become apparent to those skilled in the art from the following discussion, appended claims, in which:

FIGURE 1 diagrammatically illustrates, in partial section, one type of continuous combustion power plant, that of the turbojet type, which is operating by the improved method of this invention;

FIGURE 2 is a cross-sectional view of FIGURE 1 taken along the plane indicated;

FIGURE 4 is a graph showing the effect of ammonia on the density of smoke resulting from the combustion of various hydrocarbon fuels, such smoke being an index of carbon formation;

Figure 3:
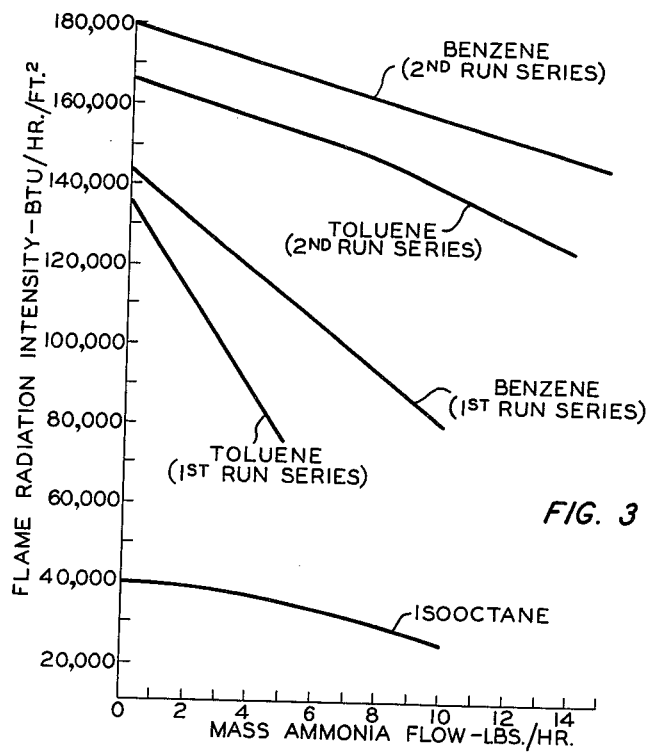
FIGURE 3 is a graph showing the effect of ammonia on the flame radiation intensity of various hydrocarbon fuels burned in a jet combustor.

We have discovered that the combustion efficiency of hydrocarbon fuels, including those of the aromatic type as well as those of the paraffin and naphthenic types, used in the operation of continuous combustion power plants can be improved by directly supplying or introducing ammonia into the combustion chamber of such power plants, concomitantly with the introduction of hydrocarbon fuel and air. By so practicing the instant invention, the above discussed difficulties or problems are overcome to a great extent, and the foregoing objects and advantages achieved.

Although this invention is particularly applicable in the operation of turbojets, and this invention is illustrated hereinafter as applied to a turbojet, it is to be undedstood that this invention is not to be unduly limited thereto, but it is applicable as well to the operation of any continuous combustion power plant, such as ramjets, pulsejets and the like.

All of these continuous combustion power plants for jet engines comprise an air intake section, a fuel addition and combustion section, and an exhaust section. Air is taken from the atmosphere, heated by some device, and then expelled rearwardly at a velocity greater than that of the air being taken into the jet engine, thereby producing thrust. The term "continuous combustion" as used herein and in the appended claims is meant to cover that combustion characterized by the ever-presence of a flame in the combustion zone. One distinctive difference in operation, however, is apparent in the compression of the air. In a turbojet engine, the air intake section and means for effecting such air intake employs a rotating compressor, such as a gas turbine driven compressor, the combustion gases passing through a turbine which utilizes part of the heat energy released in driving the compressor, the gases then being exhausted through the exhaust section or tail pipe. In a ramjet engine, the air is compressed by the ramming effect of the oncoming air. In a pulsejet engine, the air is compressed by the ramming effect of the oncoming air and the compressed air is intermittently introduced into the combustion zone and admixed with fuel, the resulting combustion causing rapid rise and fall in pressure which in turn causes the closing and opening of check valves upstream of the combustion zone to prevent the escape of gases through the upstream end of the engine.

The fuel injected into the combustion chamber of a jet engine is initially ignited by a spark producing device, such as a conventional spark plug mounted in the wall of the combustion chamber. Thereafter, additional fuel is ignited by the burning fuel or by the heat from the hot combustion gases remaining in the combustion zone or by the hot walls of the combustion chamber. The air and combustion gases within the combustion chamber are heated by the heat of combustion and exhausted from the combustion chamber.

According to this invention, the combustion systems of these conventional continuous combustion power plants is modified in that ammonia, a low flame velocity material, is injected or otherwise introduced directly into the combustion chamber concomitantly with the injection of fuel and air. Such introduction of ammonia may be continuous or periodic, e.g., between 0.5 and 2 minutes. For example, when high operating pressures are used or when rich fuel-air mixtures are used as on takeoff, ammonia is then introduced as stated above since carbon formation and flame radiation are more pronounced when operating the engine under these conditions.

Referring now to the drawings, wherein like reference numerals are used to designate like parts, and initially to FIGURES 1 and 2, a continuous combustion power plant is illustrated, the particular type being shown being that of a turbojet generally designated 10. The turbojet engine 10 comprises an air inlet section 11, a compressor section 12, a combustion section 13 and a turbine section 14. The upstream end of the turbine engine is open so as to permit the introduction of ambient air into the air inlet section 11 and its subsequent introduction at a high velocity into the compressor section 12 wherein the air is compressed by a compressor rotor drum 15 having a plurality of compressor blades cooperating with stator blades 16 on inside wall of compressor section 12. Disposed within the combustion section 13 is at least one combustion chamber and preferably a plurality of combustion chamber 17 arranged in a circular and symmetrical fashion, each combustion chamber being cylindrical in shape and streamline in design, the upstream ends of which are open and communicate with the downstream end of the compressor section 12. Axially disposed within each of the combustion chamber 17 in annularly spaced relationship is a cylindrical flame tube 18, the upstream end being open and defining a primary air inlet and the downstream end being open and in communication with the turbine section 14. The annular space 20 between combustion chamber 17 and flame tube 18 is closed at its downstream end and opens at its upstream end to compressor section 12. Axially disposed in the center of the symmetrically arranged combustion chambers 18 is a turbine shaft 19 which is secured at its upper end to compressor rotor drum 15, the downstream end of the turbine shaft being connected to a streamlined tail cone 21 having a plurality of radiating and spaced turbine blades 22. Mounted in the upstream end of the flame tube 18 is a suitable fuel nozzle 23 which is annularly surrounded by a suitable nozzle 24 for injecting ammonia, the upstream end of the flames tube 18 adjacent these nozzles being termed a primary combustion zone where combustion of the fuel is initiated. Nozzle 23 is operatively connected to a fuel line 26 which is in turn operatively connected to a fuel manifold 27 to which fuel is supplied via line 28, having a suitable throttle valve therein, from a source 29 thereof. Nozzle 24 is similarly connected to a line 31 which is in turn connected to a similar manifold 32 that is connected via line 33, having a suitable throttle valve therein, to a supply of ammonia 34. Each flame tube 18 is provided with a plurality of small regularly spaced openings or perforations 36 along its length so as to permit the introduction of secondary or quenching air from the annular space 20 into the flame tube, the portion of the flame tube having these perforations defining what is termed a secondary combustion zone, where the combustion gases are diluted and cooled, the secondary air also assisting in some instances the complete combustion of the fuel.

In the operation of the turbojet illustrated in FIGURES 1 and 2, the introduction of air into the air section 11 and its compression in the compressor section 12 and the subsequent exhaust of the combustion gases from the combustion zone into the turbine section 14 and out through the rearward opening, are all conventional operations which will not be described in detail in the interest of brevity.

The fuel injected or sprayed in its liquid form into the flame tube 17 via the fuel nozzle 23 and its mixture with primary air introduced into the primary air inlet at the upstream end of the flame tube, is also a conventional operation. The atomized fuel and air mixture burns in the primary combustion zone and the resulting combustion products are admixed and cooled in the secondary combustion zone with secondary air introduced through the perforations 32 from the annular space 20. As mentioned hereinbefore, the combustion of many types of hydrocarbon fuels results in excessive carbon formation, this carbon tending to deposit on the walls of the combustion chamber and heat being transferred from the luminous, carbon-containing combustion gases to the combustion chamber walls and turbine blades as well as other exposed engine parts. To minimize this carbon formation and deposition, and decrease flame radiation, especially at high operating pressures and when using hydrocarbon fuels of high aromatic content, ammonia, in either its gaseous or liquid form, is injected under sufficient pressure into the primary combustion zone via nozzles 24 concomitantly with the introduction of the fuel and air.

The control of the ammonia/fuel ratio can be accomplished by any suitable means. For example, a thermocouple can have its hot junction located at the surface of the flame tube, preferably at the upstream end thereof. The thermocouple can then be operatively connected to an amplifier which in turn sends a signal, proportional to the emmisivity of the flame, to a suitable servo mechanism which operatively controls the ammonia and/or fuel throttle valves.

Figure 6:
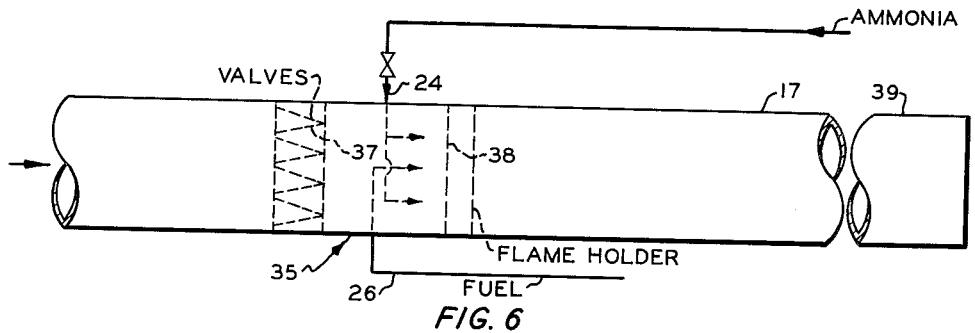
FIGURES 6 and 7 diagrammatically illustrate two other types of power plants, a pulse jet and a ram jet, respectively, which embody the improved method of this invention.

FIGURE 6 is a diagrammatic representation of a conventional pulse jet engine. This pulse jet engine generally designated 35 is open at its upstream and downstream ends so as to permit the passage of air therethrough. Immediately downstream of the upstream end of engine 35 Cade 2,636,342 of April 28, 1953, issued prior to the filing date of the present application.

The fuels which can be employed in this invention include the conventional jet engine fuels which comprise a blend of hydrocarbons boiling in the range from about 100° to 700° F., such as gas-oils, kerosene, and aviation gasoline, as well as heavier hydrocarbon fractions of low volatility containing high aromatic content, which fractions are not usually burned in jet engines because of their tendency to form excessive carbon and exhibit severe flame radiation. Indeed, fuels of the paraffin and naphthenic types having relatively low aromatic content, i.e., not more than about 20 percent, as well as fuels of the aromatic type having high aromatic content from about 20 up to 100 percent, can be employed in operating continuous combustion jet engines according to this invention. Fuels having wide boiling range fractions, such as JP–3 or JP–4, or fuels of the kerosene type, such as JP–5, can be employed, the boiling range of these fuels generally being in the range of about 200–600° F. The aromatic components present in the hydrocarbon fuels applicable in this invention can either be low boiling or high boiling, or both. A host of different aromatic compounds will be present in these fuels, representative compounds including benzene, toluene, cumene, ethylbenzene, diethylbenzene, butyl benzene, methylnaphthalene, ethylnaphthalene, diethylnaphthalene, various other alkyl substituted single and double ring aromatics, and the like. Aromatics can make up from 20 to 100 percent of the fuel volume. Representative fuels useful in the practice of this invention are set forth in Table I.

*Table 1*

|  | JP Fuels | | | | | | | | | | Highly Refined Kerosene | Normal Decane Concentrate | Heavy Alkylate |
| --- | --- | --- | --- | --- | --- | --- | --- | --- | --- | --- | --- | --- | --- |
| Distillation, ° F.: | | | | | | | | | | | | | |
| IBP | 340 | 350 | 344 | 348 | 362 | 365 | 350 | 360 | 362 | 352 | 384 | 332 | 442 |
| 5% | 368 | 378 | 303 | 370 | 383 | 374 | 370 | 380 | 382 | 373 | 408 | 334 | 446 |
| 50% | 416 | 434 | 425 | 431 | 427 | 416 | 420 | 430 | 428 | 424 | 438 | 338 | 457 |
| 95% | 480 | 516 | 501 | 498 | 490 | 465 | 490 | 499 | 505 | 489 | 480 | 341 | 492 |
| EP | 495 | 538 | 515 | 518 | 516 | 484 | 514 | 524 | 528 | 410 | 497 | 358 | 503 |
| Composition, percent vol.: | | | | | | | | | | | | | |
| Paraffins | 33.0 | 0.0 | 47.1 | 23.6 | 0.0 | 54.2 | 13.0 | 0.0 | 0.0 | 84.8 | 51.0 | 80.1 | 77.1 |
| Olefins | 2.1 | 4.5 | 2.4 | 4.9 | 3.3 | 2.9 | 1.0 | 4.0 | 4.7 | 1.2 | 3.1 | 2.3 | 3.7 |
| Naphthenes | 51.4 | 76.7 | 37.4 | 55.7 | 81.1 | 26.7 | 73.5 | 79.8 | 80.3 | 0.0 | 43.3 | 12.9 | 17.0 |
| Aromatics | 13.5 | 18.8 | 13.1 | 15.8 | 15.6 | 16.2 | 12.5 | 16.2 | 15.0 | 14.0 | 2.6 | 4.7 | 2.2 |
| Gravity, API | 45.0 | 37.8 | 43.6 | 41.8 | 37.4 | 45.8 | 41.5 | 38.0 | 37.4 | 41.5 | 48.4 | 57.0 | 49.4 | is a plurality of flapper valves 37 which open in response to normal flow of air through engine 35 but which close upon the pressure downstream of the valves becoming greater than the pressure of the incoming air. Fuel inlet conduit 26 is provided downstream of valves 37, and ammonia inlet conduit 24 having a valve therein is provided downstream of valves 37. Flame holder 38, which may be of any conventional type of flame holder, is provided downstream of inlet conduits 24 and 26. A combustion zone 17 is formed downstream of flame holder 38 wherein fuel, generally a hydrocarbon fuel, is burned in the presence of air, and ammonia introduced through the inlet conduit 24 is mixed therein. Gases resulting from the burned hydrocarbon and ammonia are exhausted through an exhaust zone 39 in the downstream end of engine 35.

Figure 7:
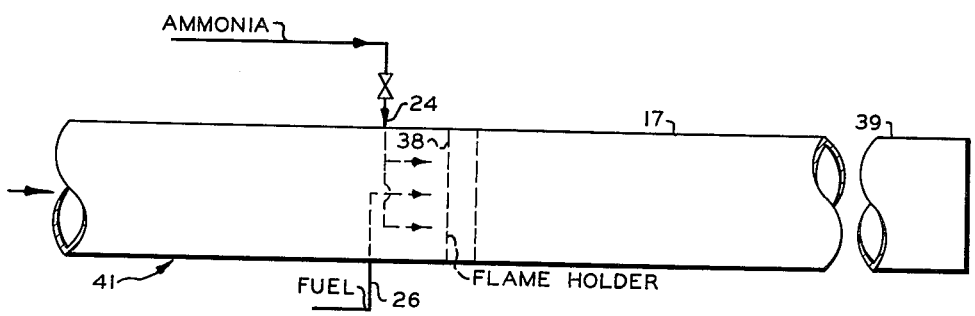

A conventional ramjet is diagrammatically shown in FIGURE 7 of the drawing. Ramjet engine 41 is open at its upstream and downstream ends so as to permit the flow of high velocity gas therethrough. The fuel inlet 26 and the ammonia inlet 24, together with flame holder 38, are positioned similar to that shown in connection with FIGURE 6. Combustion zone 17 and exhaust zone 39 are also similar to those shown in connection with FIGURE 6 of the drawing.

FIGURES 6 and 7 are based on FIGURES 1 and 3 of

The above-described jet engines may generally be operated by injecting ammonia in amounts from 10 up to 100 weight percent of the fuel flow, preferably expressed in terms of the ammonia/fuel ratio which can vary in the range between about 0.1 and 1.

Hydrocarbon fuel and air are injected into the combustion zone of the jet engine at a fuel-air ratio between 0.005 and 0.10. Turbojet engines are preferably operated on an overall fuel-air ratio between 0.01 and 0.03. Ramjet and pulsejet engines are preferably operated at overall fuel-air ratios of from 0.03 to 0.07. In the operation of this invention, fuel and air are injected into the combustion zone of the engine at a fuel-air ratio between 0.005 and 0.10. The exact fuel-air ratio which is utilized will depend upon engine design limitations, such as turbine durability and the like.

The air supplied to the turbojet engine will generally have an air inlet pressure between about 40 and 500 inches Hg abs. and will have a linear air velocity from 30 to 200 ft./sec. The fuel supplied to the combustor will have a temperature of between −60° F. and 350° F. The air usually is supplied to the combustor at a temperature between −30° F. and 900° F., more frequently between 100° F. and 760° F. Fuel injection temperatures will be dependent upon fuel characteristics such as freezing point and volatility as well as injection nozzle characteristics.

The following examples and data are supplied in order to illustrate the objects and advantages of this invention, but it should be understood that the subject invention is not to be unduly limited thereto.

In these examples, various hydrocarbon fuels were burned in a jet combustor so designed as to embody features common to full scale turbojet combustion systems. The jet combustor used in these examples was actually similar to that shown in FIGURE 1, it being provided with fuel and ammonia injection nozzles, secondary air inlet openings, etc. The combustion process in each run was carried out for a period of about 30 minutes. The hydrocarbon fuels used were selected to obtain a wide range in hydrocarbon structure, the physical properties and compositions of these fuels being set forth in Table II.

*Table II*

|  | Isooctane | Benzene | Toluene |
|---|---|---|---|
| Distillation, °F.: |  |  |  |
| IBP | 205 | 172 | 230 |
| 50% | 207 | 174 |  |
| EP | 208 | 175 | 232 |
| Composition, percent vol.: |  |  |  |
| Paraffins+naphthenes | 100 |  | 5 |
| Olefins |  |  |  |
| Aromatics |  | 100 | 95 |
| Specific Gravity | 0.692 | 0.885 | 0.872 |

The combustor operating variables are set forth in Table III.

*Table III*

Combustor pressure (in. Hg abs.) _____ 150
Combustor inlet air temperature (°F.) _____ 400
Mass air flow (lbs./sec.) _____ 0.5
Mass fuel flow (lbs./hr.) _____ 18.0

The flame radiation intensities, smoke densities, and exhaust temperatures of various runs were measured and recorded. The flame radiation measurements were made with a total radiation pyrometer ("Rayotube" made by Leeds and Northrup). The smoke density measurements of the exhaust gases were made with an E. K. von Brand continuous filter strip instrument. The exhaust temperature measurements were made with a chromel-alumel thermocouple. These measurements were made when ammonia was continuously and concomitantly injected at various flow rates. For comparison purposes, these measurements were also made when the fuel was burned in the combustor without concomitant injection of ammonia. Table IV tabulates these measurements and they are plotted in the graphs of FIGURES 3, 4 and 5.

*Table IV*

| Fuel | Mass Ammonia Flow, lbs./hr. | Flame Radiation Intensity, B.t.u./hr./ft.$^2$ | Smoke Density, percent Black | Exhaust Temperature, °F. |
|---|---|---|---|---|
| Isooctane | 0 | 40,000 |  |  |
| Do | 7 | 32,000 |  | 950 |
| Do | 10 | 25,000 |  | 1,030 |
| Toluene 1st Run Series | 0 | 136,000 | 60 | 910 |
| Do | 5 | 76,000 | 35 | 970 |
| Toluene 2nd Run Series | 0 | 166,000 |  | 880 |
| Do | 14 | 124,000 |  | 990 |
| Benzene 1st Run Series | 0 | 143,000 | 53 | 890 |
| Do | 10 | 80,000 | 35 | 1,030 |
| Benzene 2nd Run Series | 0 | 180,000 |  | 860 |
| Do | 6 | 166,000 |  | 930 |
| Do | 15 | 145,000 |  | 1,020 |

Figure 5:
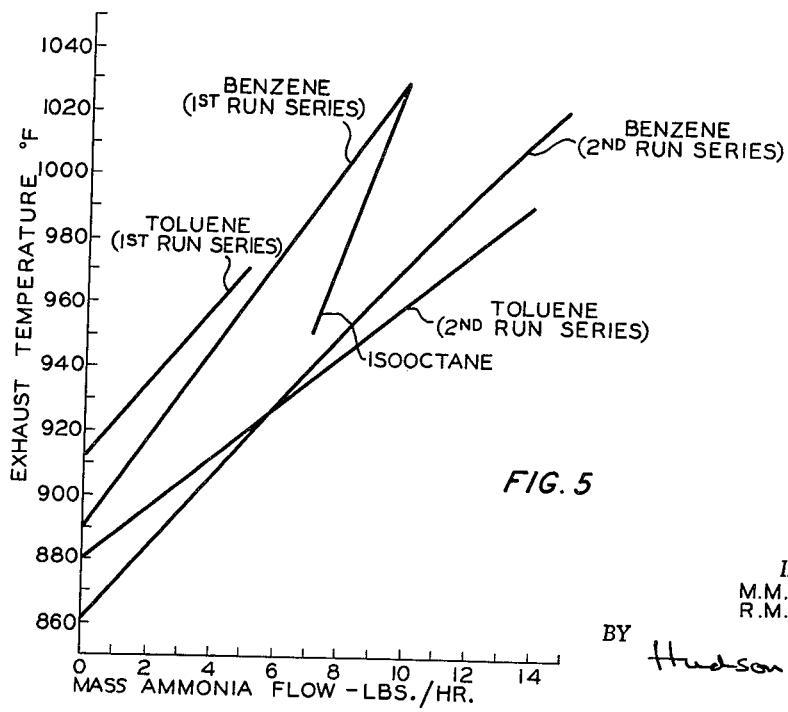
FIGURE 5 is a graph showng the effect of ammonia on the exhaust temperature of combustion gases resulting from the combustion of various hydrocarbon fuels in a jet combustor.

The data set forth in Table IV and the plots of these data in the graphs of FIGURES 3, 4 and 5 clearly demonstrate the improved combustion efficiencies obtained when practicing the continuous combustion process of this invention. As shown in FIGURE 3, the flame radiation intensities of each of the three types of hydrocarbon fuel decreased markedly with increasing mass ammonia flow. As shown in FIGURE 4, the smoke density (an index of carbon formation) in both First Run Series of toluene and benzene also decreased markedly. And as shown in FIGURE 5, the exhaust temperatures of the combustion gases of all three types of fuels increased, indicating that the thrust or engine performance was at the same time augmented with increasing mass ammonia flow. All of these results indicate that the combustion efficiency of a continuous combustion power plant can be greatly improved by the concomitant injection of ammonia into the combustion zone according to the practice of this invention. By operating in this manner, it is possible to utilize fuels of high carbon formation tendency, and resort to more expensive clean burning fuels is unnecessary in order to overcome the problem of carbon formation.

Various modifications and alterations of this invention will become apparent to those skilled in the art without departing from the scope and spirit of this invention, and it should be understood that this latter is not to be unduly limited to the foregoing discussion and accompanying drawings which set forth preferred embodiments for illustrative purposes.

We claim:

1. A method of operating a continuous combustion engine having a combustion chamber, which comprises burning a hydrocarbon fuel with air in said combustion chamber; and concomitantly injecting controlled amounts of ammonia solely and directly into the primary combustion zone in said combustion chamber adjacent said burning fuel thereby minimizing carbon formation and deposition therein.

2. In a method of operating a continuous combustion engine having a fixed combustion chamber wherein a hydrocarbon fuel is burned under operating conditions, and wherein the resulting combustion gases are exhausted from said combustion chamber, the improvement comprising concomitantly injecting ammonia solely and directly into the primary combustion zone in said combustion chamber adjacent said burning fuel at a rate sufficient to materially decrease the amount of carbon formed in said combustion chamber.

3. The method according to claim 2 wherein the ammonia-fuel weight ratio is in the range between 0.1 and 1.

4. The method according to claim 2 wherein said ammonia is continously injected into said combustion chamber.

5. The method according to claim 2 wherein said ammonia is periodically introduced into said combustion chamber.

6. The method according to claim 2 wherein said ammonia is injected into said combustion chamber in its liquid state.

7. The method according to claim 2 wherein said hydrocarbon fuel has a low aromatic content.

8. The method according to claim 2 where said hydrocarbon fuel has a high aromatic content.

9. The method according to claim 2 wherein said hydrocarbon fuel is benzene.

10. The method according to claim 2 wherein said hydrocarbon fuel is toluene.

11. The method according to claim 2 wherein said hydrocarbon fuel is isooctane.

12. In a method of operating a turbojet engine having a combustion chamber comprising a primary combustion zone and a secondary combustion zone, wherein hydrocarbon fuel and primary air are mixed and burned in said primary combustion zone, the resulting combustion gases are admixed in the secondary air in said secondary combustion zone, the resulting cooled combustion gases are passed through a turbine to expand the same, and said latter gases are passed to the atmosphere, whereby thrust is imparted to said engine, the improvement comprising concomitantly injecting liquid ammonia solely and directly into said primary combustion zone adjacent said burning fuel at an ammonia-fuel weight ratio in the range of about 0.1 to 1, thereby decreasing the amount of carbon formed in said combustion chamber.

References Cited in the file of this patent

UNITED STATES PATENTS

| | | |
|---|---|---|
| 2,218,281 | Ridder et al. | Oct. 15, 1940 |
| 2,559,814 | Whittle | July 10, 1951 |
| 2,609,279 | Morris et al. | Sept. 2, 1952 |
| 2,636,342 | Cade | Apr. 28, 1953 |
| 2,648,196 | Mullen et al. | Aug. 11, 1953 |
| 2,771,738 | Scott et al. | Nov. 7, 1956 |
| 2,929,200 | Wasserbach et al. | Mar. 22, 1960 |